(12) United States Patent
Kim et al.

(10) Patent No.: US 10,770,702 B2
(45) Date of Patent: Sep. 8, 2020

(54) JIG SET INCLUDING HANDLE FOR MOUNTING ENERGY STORAGE SYSTEM

(71) Applicant: LG CHEM, LTD., Seoul (KR)

(72) Inventors: Ki-Youn Kim, Daejeon (KR); In-Jae Gang, Daejeon (KR); Jin-Kyu Shin, Daejeon (KR); Bum-Hyun Lee, Daejeon (KR); Sang-Hyun Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 112 days.

(21) Appl. No.: 16/073,062

(22) PCT Filed: Aug. 24, 2017

(86) PCT No.: PCT/KR2017/009291
§ 371 (c)(1),
(2) Date: Jul. 26, 2018

(87) PCT Pub. No.: WO2018/093018
PCT Pub. Date: May 24, 2018

(65) Prior Publication Data
US 2019/0058173 A1   Feb. 21, 2019

(30) Foreign Application Priority Data
Nov. 21, 2016  (KR) .......... 10-2016-0155062

(51) Int. Cl.
*H01M 2/10*   (2006.01)
(52) U.S. Cl.
CPC ....... *H01M 2/1077* (2013.01); *H01M 2/1005* (2013.01)

(58) Field of Classification Search
CPC .......... H01M 2/1005; H01M 2/1077
USPC ............ 429/99
See application file for complete search history.

(56) References Cited

U.S. PATENT DOCUMENTS

| 4,673,625 A | 6/1987 | McCartney et al. |
| 4,861,687 A * | 8/1989 | Brantley .......... H01M 2/1005 429/187 |
| 6,117,587 A | 9/2000 | Kitami et al. |
| 2010/0255713 A1 | 10/2010 | Peng |

(Continued)

FOREIGN PATENT DOCUMENTS

| DE | 9314019 U1 * | 12/1993 | .......... H01M 2/1005 |
| EP | 2131438 A1 | 12/2009 | |
| FR | 795360 A | 3/1936 | |

(Continued)

OTHER PUBLICATIONS

International Search Report (PCT/ISA/210) issued in PCT/KR2017/009291, dated Nov. 20, 2017.

*Primary Examiner* — Sean P Cullen
(74) *Attorney, Agent, or Firm* — Birch, Stewart, Kolasch & Birch, LLP

(57) ABSTRACT

A jig set for mounting an ESS pack, which is used to mount an ESS pack to a wall or a structure corresponding to the wall, includes: a mounting unit having a partially protruding portion capable of being coupled to one surface of an ESS pack case; and a handle unit including a handlebar to be grasped by an operator, and a locking bar, which is integrally connected to the handlebar and is attachable to and detachable from the protruding portion of the mounting unit.

10 Claims, 10 Drawing Sheets

(56) References Cited

U.S. PATENT DOCUMENTS

2014/0354127 A1* 12/2014 Huang ................... B25G 3/38
312/244
2017/0331081 A1* 11/2017 Choi ....................... H01M 2/10

FOREIGN PATENT DOCUMENTS

| | | |
|---|---|---|
| JP | 60-40961 U | 3/1985 |
| JP | 61-60465 U | 4/1986 |
| JP | 8-34301 A | 2/1996 |
| JP | 3022152 U | 3/1996 |
| JP | 9-190807 A | 7/1997 |
| JP | 2004-220791 A | 8/2004 |
| JP | 2008-260395 A | 10/2008 |
| JP | 2016-19310 A | 2/2016 |
| KR | 20-0432713 Y1 | 12/2006 |

\* cited by examiner

JIG SET INCLUDING HANDLE FOR MOUNTING ENERGY STORAGE SYSTEM

TECHNICAL FIELD

The present disclosure relates to a jig set for mounting an energy storage system (ESS), and more particularly, to a jig set for an operator to easily handle an ESS battery pack when the ESS battery pack is mounted to a wall or a structure corresponding to the wall.

The present application claims priority to Korean Patent Application No. 10-2016-0155062 filed on Nov. 21, 2016 in the Republic of Korea, the disclosure of which is incorporated herein by reference.

BACKGROUND ART

Recently, secondary battery manufacturers release residential ESS packs as new products. These ESS packs, which are lithium ion batteries, store power during the daytime and allow the power to be used when the power is required, thereby reducing electric charges. For example, electricity produced by using solar panels, wind power generation, or the like may be stored in a lithium ion battery and taken out to be used.

For example, a residential ESS pack has a size of about 120 cm×about 80 cm×about 20 cm and a weight of about 100 kg, and several residential ESS packs may be connected to be used. Of course, ESS packs may have different sizes and weights depending upon storage capacities thereof.

A residential ESS pack may be manufactured in a wall-mounted type for user convenience and space usability and mounted to indoor or outdoor walls, columns, or the like, and in this case, a wall-mounting bracket may be added according to properties of a corresponding product.

As schematically shown in FIG. 1, an ESS pack 1 according to the related art further includes a handle 2 for convenience of a mounting operator in many cases. Considering that a general ESS pack has a weight of 100 kg or more, if there is no handle, it is not easy for a general operator to handle an ESS pack, and furthermore, it is more difficult to lift up an ESS pack to a predetermined height. However, since a handle is required for an ESS pack only when mounting the ESS pack, a handle insignificantly contributes the utility of an ESS pack itself. In other words, although a handle of an ESS pack has the meaning of existence in terms of mounting convenience, a handle is merely a meaningless component occupying a space of an ESS pack after mounting the ESS pack. In addition, since an ESS pack, which is designed to include a handle, further includes an additional component and has a structure changed thereby, it is pointed out that an ESS pack designed to include a handle is not economical.

DISCLOSURE

Technical Problem

The present disclosure is designed to solve the problems of the related art, and therefore the present disclosure is directed to providing a jig set for mounting an ESS pack, the jig set allowing removal of a handle from the ESS pack and easy handling of the ESS pack when mounting the ESS pack.

However, the present disclosure is not limited to the aspects set forth above, and other aspects of the present disclosure may be clearly understood by those skilled in the art from the following detailed description.

Technical Solution

In one aspect of the present disclosure, there is provided a jig set for mounting an ESS pack, which is used to mount an ESS pack to a wall or a structure corresponding to the wall, the jig set comprising: a mounting unit having a partially protruding portion capable of being coupled to one surface of an ESS pack case; and a handle unit comprising a handlebar to be grasped by an operator, and a locking bar, which is integrally connected to the handlebar and is attachable to and detachable from the protruding portion of the mounting unit.

The mounting unit may comprise a fastening portion, a latch portion, and a head portion, which are defined along a length direction of the mounting unit, the fastening portion being fixed and coupled to an inside of the ESS pack case, the latch portion and the head portion being exposed outside the ESS pack case, and the latch portion having a diameter less than a diameter of the head portion; and the locking bar may have a shape of a plate having a thickness less than a length of the latch portion and comprise a latch catching portion at one side forming the thickness of the plate, the latch catching portion comprising an opening, which is larger than the diameter of the latch portion and smaller than the diameter of the head portion, and a catching space extending inward from the opening.

The width of the catching space in a front/rear-direction identical to a direction of formation of the opening may be less than the width of the catching space in an up/down direction intersecting the front/rear-direction, and the width of the catching space in the front/rear-direction may be less than the diameter of the head portion.

The opening may be located in a central region of the catching space, and the latch catching portion may have a C-shape.

The opening may have a shape tapered toward the catching space.

The mounting unit may be provided in a plural number to be spaced apart from each other by a predetermined interval in at least one of vertical and horizontal directions with respect to the ESS pack case, and the locking bar may include a plurality of latch catching portions formed at positions spaced apart from each other to be in one-to-one correspondence with the mounting units spaced apart from each other.

The plurality of mounting units may comprise a first mounting unit group arranged in the up/down direction at a rear left edge of the ESS pack case and a second mounting unit group arranged in the up/down direction at a rear right edge of the ESS pack case, and the handle unit may comprise a first handle unit attachable to and detachable from the first mounting unit and a second handle unit attachable to and detachable from the second mounting unit.

The handlebar and the locking bar may form an angle of 90 degrees or more.

The mounting unit may be a bolt-type member configured to integrally combine a front cover plate and a rear cover plate, which form the ESS pack case.

Advantageous Effects

According to one aspect of the present disclosure, there may be provided the jig set for mounting an ESS pack, the jig set allowing removal of a handle from an existing ESS pack and easy handling of an ESS pack when mounting the ESS pack.

According to another aspect of the present disclosure, the mounting unit may be a component of the jig set, which is used to transport an ESS pack, and may also be used to fasten assembly parts of the ESS pack case.

In addition, the handle unit is portable by an operator, and thus may be reused when mounting a compatible ESS pack.

In addition, according to the configuration of the jig set for mounting an ESS pack, since an ESS pack may be designed to include no handle, manufacturing costs of the ESS pack may be reduced.

BEST MODE

Figure 1:
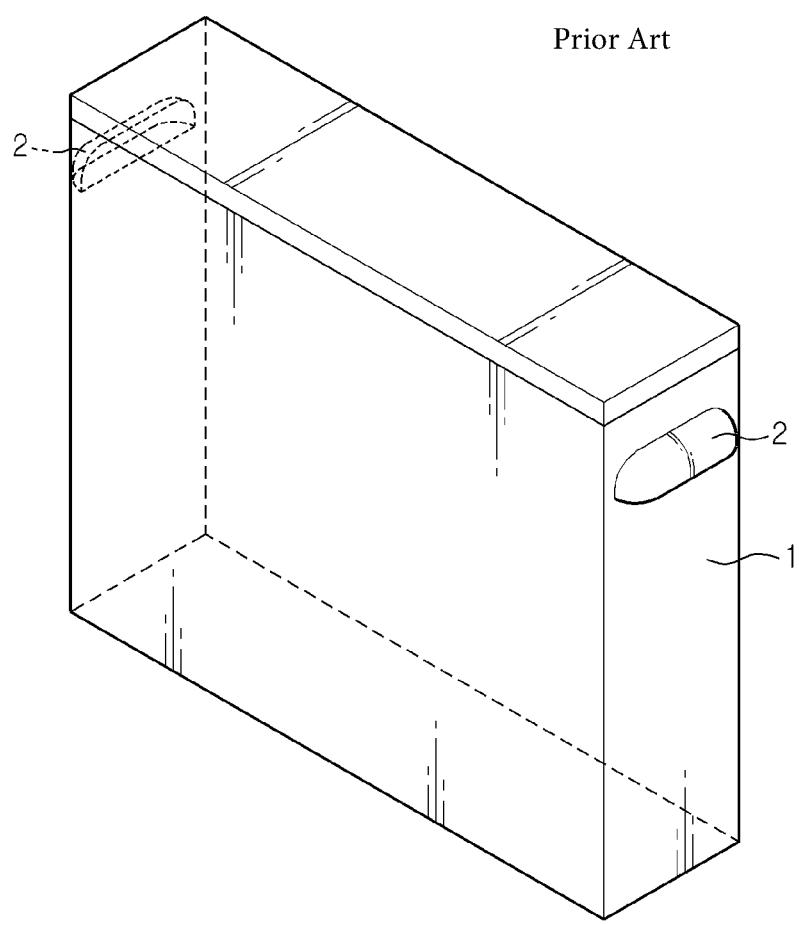
FIG. 1 is a perspective view illustrating a schematic configuration of an ESS pack according to the related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, since embodiments described herein and configurations shown in the drawings are merely preferable examples and do not represent all technical aspects of the present disclosure, it should be understood that various equivalents and modified examples could be made without departing from the scope of the disclosure.

Since embodiments of the present disclosure are provided for more complete description to those skilled in the art, shapes, sizes and the like of components in the drawings may be exaggerated, omitted, or schematically illustrated for clarity. Therefore, the size or proportion of each component does not completely reflect the actual size or proportion thereof.

Figure 2:
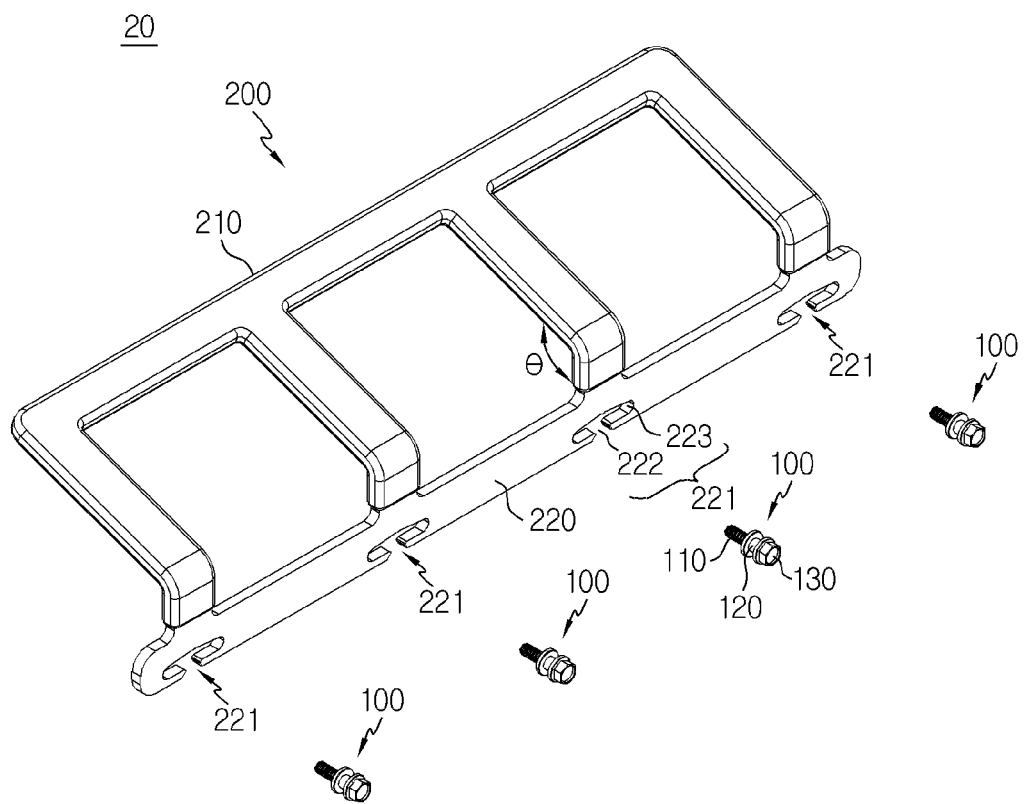
FIG. 2 is a perspective view illustrating a jig set for mounting an ESS pack, according to an embodiment of the present disclosure.
Figure 3:
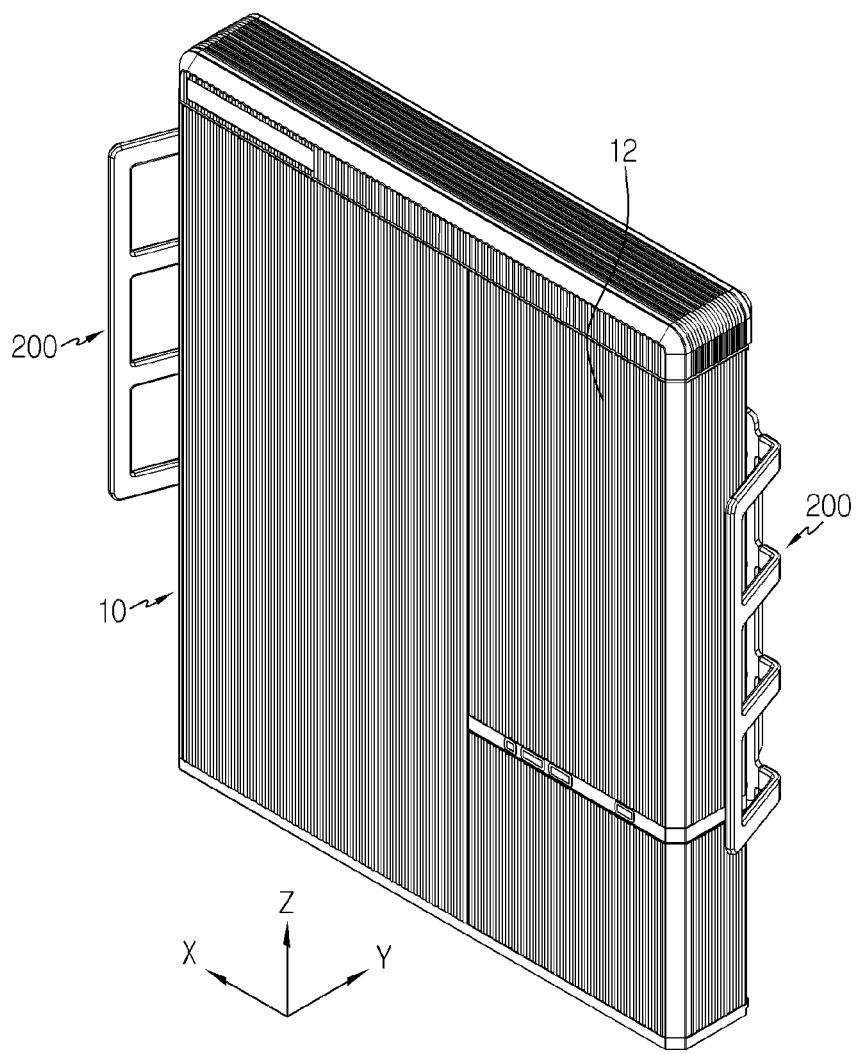
FIG. 3 is a perspective view illustrating that a jig set for mounting an ESS pack according to an embodiment of the present disclosure is mounted to an ESS pack.
Figure 4:
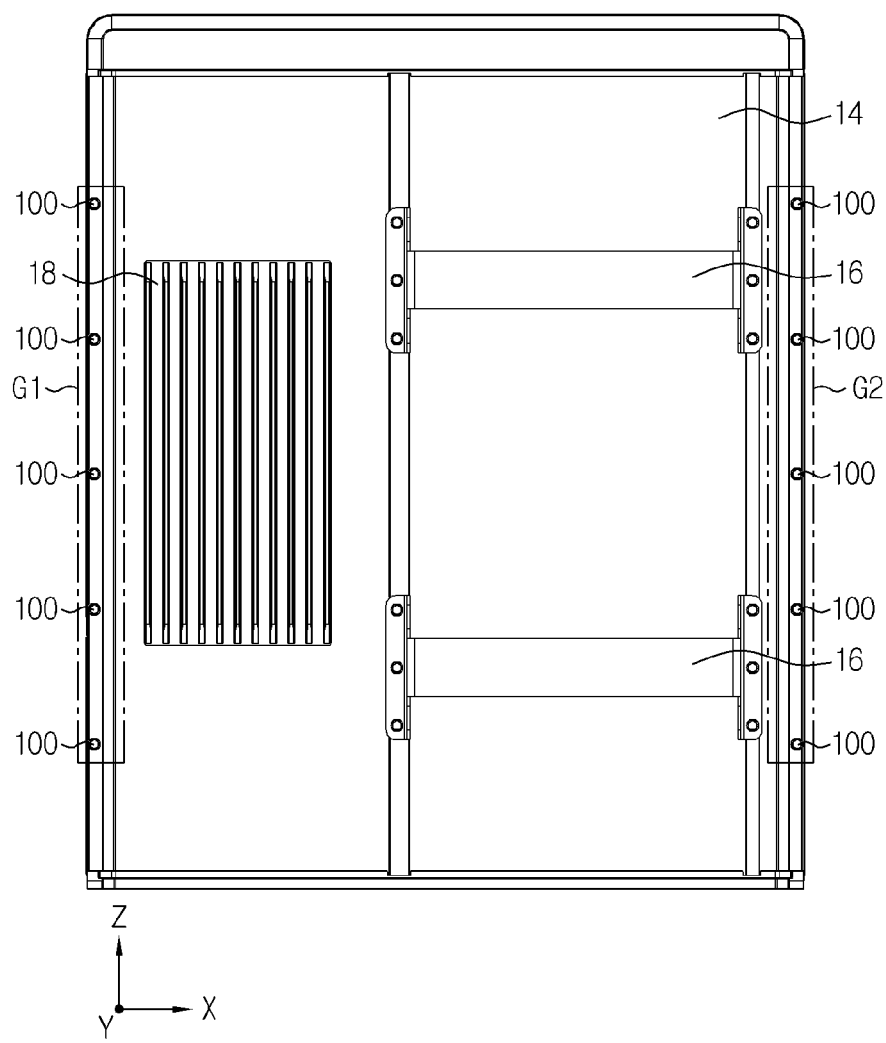
FIG. 4 is a diagram illustrating a rear surface of the ESS pack to which mounting units according to an embodiment of the present disclosure are coupled.
Figure 5:
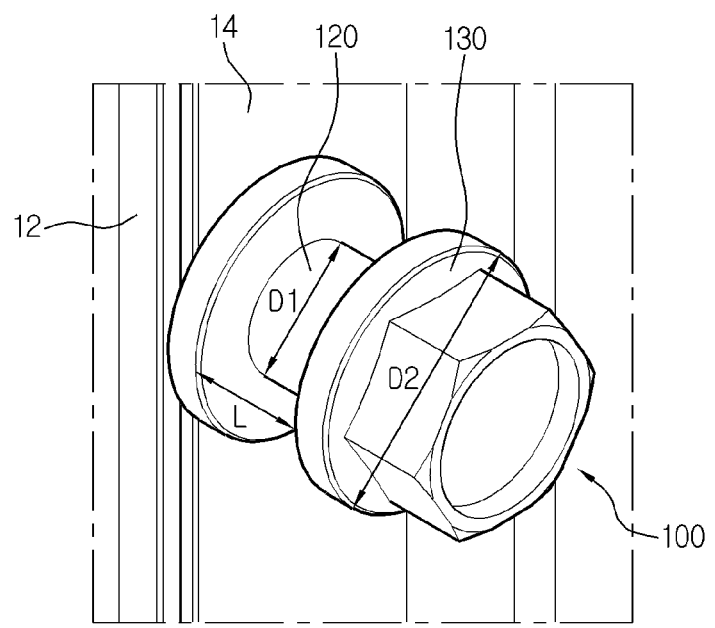
FIG. 5 is an enlarged perspective view of one of the mounting units of FIG. 4.
Figure 6:
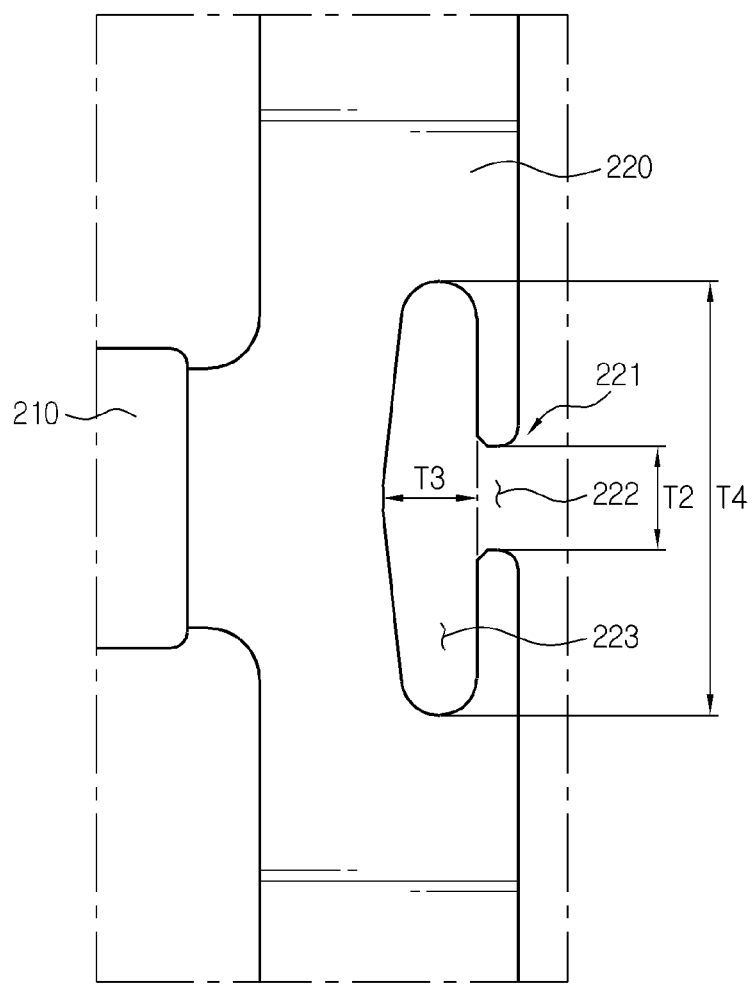
FIG. 6 is an enlarged view of a latch catching portion of a handle unit according to an embodiment of the present disclosure.
Figure 7:
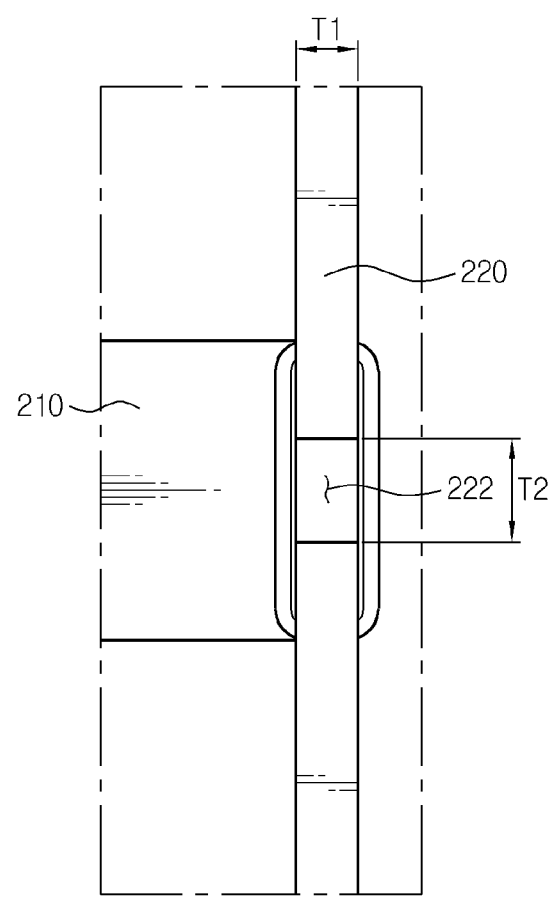
FIG. 7 is a diagram of the latch catching portion of FIG. 6, viewed from a different angle.

FIG. 2 is a perspective view illustrating a jig set for mounting an ESS pack, according to an embodiment of the present disclosure; FIG. 3 is a perspective view illustrating that a jig set for mounting an ESS pack according to an embodiment of the present disclosure is mounted to an ESS pack; FIG. 4 is a diagram illustrating a rear surface of the ESS pack to which mounting units according to an embodiment of the present disclosure are coupled; FIG. 5 is an enlarged perspective view of one of the mounting units of FIG. 4; FIG. 6 is an enlarged view of a latch catching portion of a handle unit according to an embodiment of the present disclosure; and FIG. 7 is a diagram of the latch catching portion of FIG. 6, viewed from a different angle.

Referring to these figures, a jig set 20 for mounting an ESS pack, according to an embodiment of the present disclosure, includes a mounting unit 100 coupled to one surface of an ESS pack case 10, and a handle unit 200 attachable to and detachable from the mounting unit 100.

In an ESS pack to which the jig set 20 for mounting an ESS pack, according to this embodiment, is applied, since the mounting unit 100 is coupled to a rear cover plate of the ESS pack, there is no need for a separate handle. The mounting unit 100 may be used as an assembly part of the ESS pack, and is a component enabling attachment of the handle unit 200 when the ESS pack is transported. The handle unit 200, which is configured to be attachable to and detachable from the mounting unit 100 coupled to the ESS pack, may be used when mounting the ESS pack, kept by an operator after mounting the ESS pack, and then reused for mounting another ESS pack.

First, as for the mounting unit 100, a plurality of mounting units 100 may be prepared, and may be fastened to the ESS pack case 10 so as to be arranged on both sides of a rear cover plate 14 of the ESS pack while spaced apart from each other by a predetermined interval in a vertical direction. Here, the interval between adjacent mounting units 100 corresponds to an interval between latch catching portions 221 of the handle unit 200, which will be described below.

More specifically, as shown in FIG. 4, the plurality of mounting units 100 may include a first mounting unit group G1 and a second mounting unit group G2, the first mounting unit group G1 may be defined as the mounting units 100 arranged at a rear left edge of the ESS pack case 10 in the vertical direction, and the second mounting unit group G2 may be defined as the mounting units 100 arranged at a rear right edge of the ESS pack case 10 in the vertical direction.

One handle unit 200 may be attached to and detached from the first mounting unit group G1, and another handle unit 200 may be attached to and detached from the second mounting unit group G2. Therefore, two handle units 200 may be attached to both sides of the rear surface of the ESS pack, and two operators may be respectively in charge of the two handle units 200.

Of course, depending upon design changes of the ESS pack case 10, the plurality of mounting units 100 may be spaced apart from each other by a predetermined interval in at least one of vertical and horizontal directions with respect to the ESS pack case 10.

The mounting unit 100 may be provided in the form of a bolt integrally combining a front cover plate 12 and a rear cover plate 14, which form the ESS pack case 10.

That is, as shown in FIGS. 2 and 5, the mounting unit 100 may include a fastening portion 110, a latch portion 120, and a head portion 130, which are defined with reference to a length direction thereof. The fastening portion 110 may include screw threads therearound similarly to a bolt and thus be fastened into the ESS pack case. Both sides of the front cover plate 12 of the ESS pack may be respectively fixed and coupled to both sides of the rear cover plate 14 of the ESS pack by the fastening portion 110. The head portion 130 may have a nut shape such that a spanner may be used to tighten the fastening portion 110 into the ESS pack case 10. Of course, the scope of the present disclosure is not limited to the head portion 130 having a nut shape. Alternatively, the head portion 130 may include a cross-shaped or straight groove, and a driver corresponding thereto may be used.

As shown in FIGS. 4 and 5, when the fastening portion 110 is completely fastened to the front and rear cover plates 12 and 14 of the ESS pack, the latch portion 120 and the head portion 130 protrude from a rear surface of the ESS pack case 10 (in a Y-axis direction of FIG. 4).

The latch portion 120 and the head portion 130 have different diameters from each other. More specifically, referring to FIGS. 5 and 6, the latch portion has a diameter D1 enough to at least pass through an opening 222 of the latch catching portion 221 described below, and the head portion has a diameter D2 greater than that of the latch portion 120.

In addition, the diameter D2 of the head portion is greater than a front/rear-direction width T3 of a catching space 223 of the latch catching portion 221 such that the latch catching portion 221 does not deviate in a direction vertical to the mounting unit 100 (Y-axis direction).

Next, as for the handle unit 200, the handle unit 200 includes a handlebar 210 and a locking bar 220. The handle bars include a plurality of first sections spaced from each other along the locking bar and extending outwardly from the locking bar and a second section connected to the distal ends of the plurality of first sections, as seen in FIG. 2. The handlebar 210 and the locking bar 220 may be manufactured as a metallic integrated structure to withstand the weight of the ESS pack. Of course, the handlebar 210 and the locking bar 220 may be configured to be separable from each other.

An angle θ formed by the handlebar 210 and the locking bar 220 may be 90 degrees or more. A general ESS pack has an approximately rectangular parallelepiped shape, and the locking bar 220 (see FIG. 2) may be mounted to the latch portion 120 of the mounting unit 100 located on the rear surface of the ESS pack. Therefore, the handle unit 200 is configured such that the handlebar 210 forms an angle of 90 degrees or more with respect to the locking bar 220, whereby an operator may easily grasp the handlebar 210 while standing in front of the ESS pack.

Referring to FIGS. 2 and 5 to 7, the locking bar 220 may be provided in the shape of a plate having a thickness T1 that is at least less than a length L of the latch portion 120. In addition, the locking bar 220 may include latch catching portions 221 arranged at predetermined intervals along a length direction of the locking bar 220. For example, a plurality of latch catching portions 221 may be formed at positions spaced apart from each other in the locking bar 220 to be in one-to-one correspondence with the mounting units 100 spaced apart from each other.

Although the locking bar 220 includes four latch catching portions 221 in total in this embodiment, the scope of the present disclosure is not limited thereto. For example, depending upon the size and weight of the ESS pack and the number of the corresponding mounting units 100, the number of the latch catching portions 221 may be changed.

The latch catching portion 221 may be a space formed by recessing the plate inward from one side forming the thickness of the locking bar 220. The latch catching portion 221 includes the opening 222 and the catching space 223.

The opening 222 has a width T2 that is greater than or equal to the diameter D1 of the latch portion and less than the diameter D2 of the head portion. Therefore, only the latch portion 120 of the mounting unit 100 may pass through the opening 222.

The catching space 223 is a space extending inward from the opening 222, and a width T3 of the catching space 223 in a front/rear direction identical to a direction of formation of the opening 222 is less than a width T4 of the catching space 223 in an up/down direction intersecting the front/rear direction. In addition, the width T3 of the catching space 223 in the front/rear direction is less than the diameter of the head portion 130 of the mounting unit 100. Therefore, for example, if the locking bar 220 is mounted such that the latch portion 120 of the mounting unit 100 coupled to the ESS pack case 10 is located in the catching space 223, the locking bar 220 may be confined between the ESS pack case 10 and the head portion 130 of the mounting unit 100.

In the case of this embodiment, the opening 222 is located in a central region of the catching space 223, whereby the latch catching portion 221 may have a shape of an approximately alphabetical character "C". In this case, a range, in which the latch portion 120 may be located within the catching space 223, may be increased, and the latch portion 120 may be hung in both up and down directions of the catching space 223, with the opening 222 as the center, whereby the handle unit 200 may be mounted to the mounting unit 100 in various manners. For example, the handle unit 200 may be mounted upside down, or may be mounted from one direction selected from front and rear directions of the ESS pack.

Figure 8:
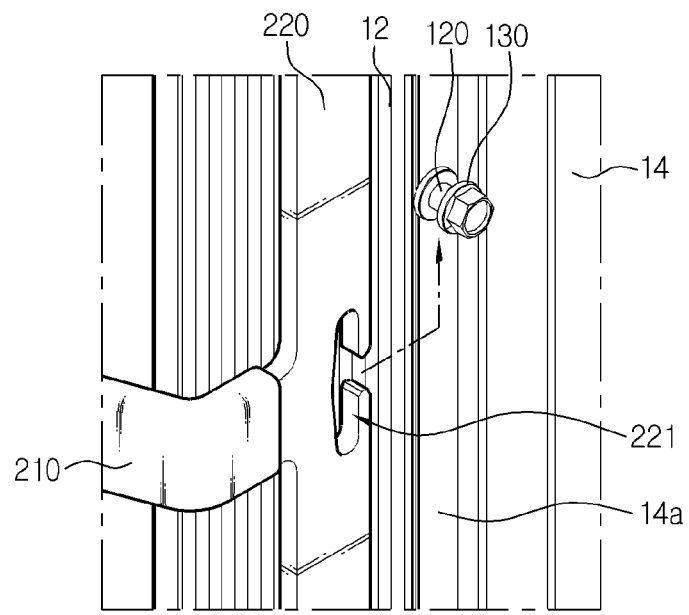
FIGS. 8 and 9 are partially enlarged views respectively illustrating states before and after the handle unit and the mounting unit according to an embodiment of the present disclosure are attached to each other.
Figure 9:
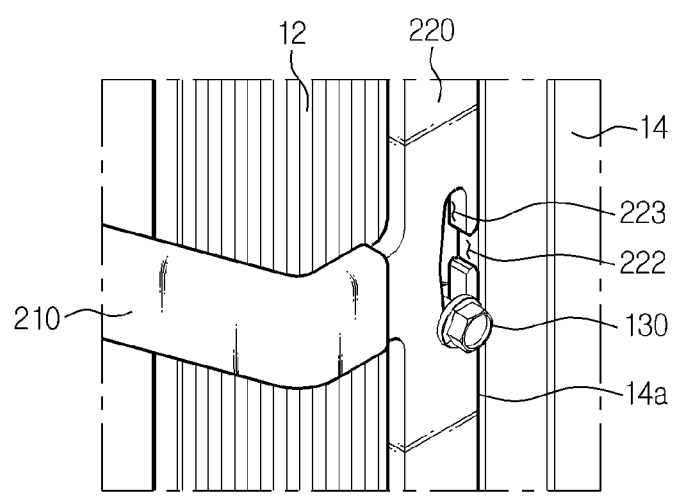
Figure 10:
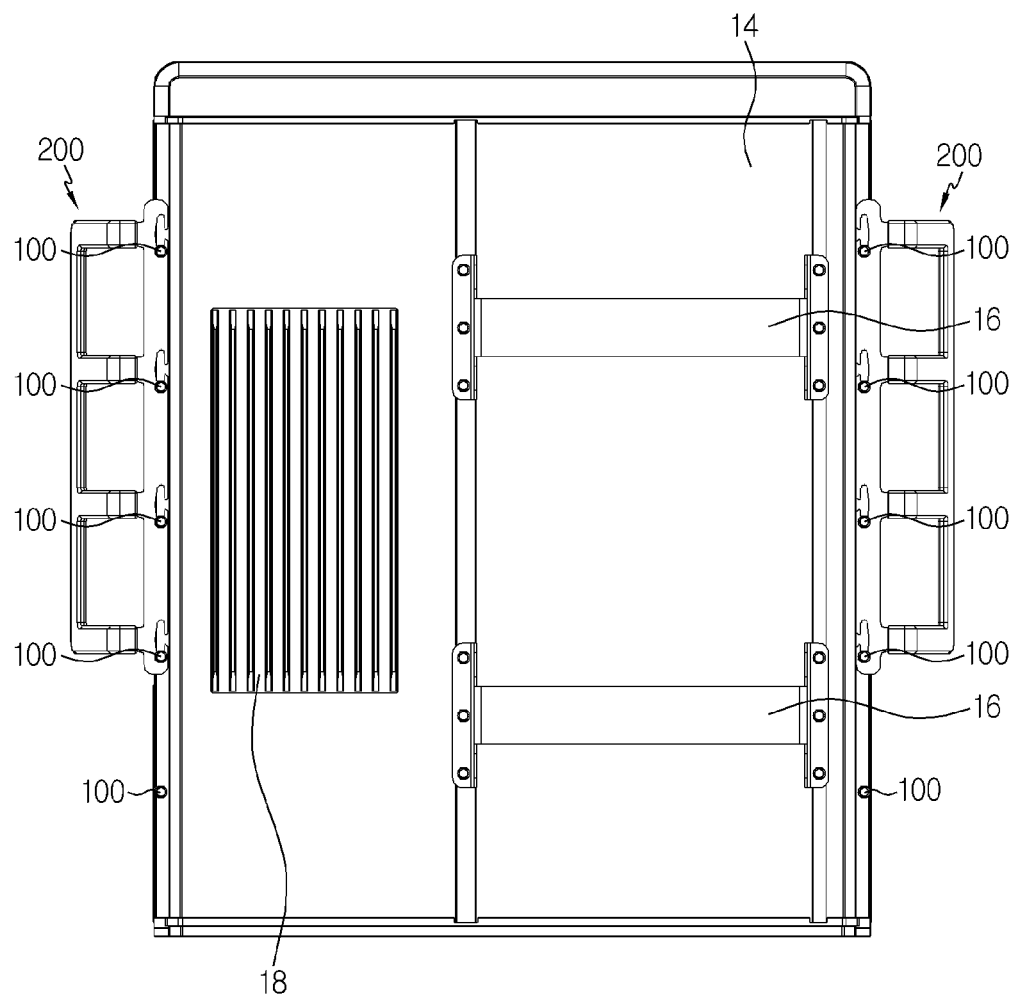
FIG. 10 is a rear view of the ESS pack to which the handle unit according to an embodiment of the present disclosure is attached.

FIGS. 8 and 9 are partially enlarged views respectively illustrating states before and after the handle unit 200 and the mounting unit 100 according to an embodiment of the present disclosure are attached to each other, and FIG. 10 is a rear view of the ESS pack to which the handle unit 200 according to an embodiment of the present disclosure is attached.

Hereinafter, a method of performing attachment and detachment between the handle unit 200 and the mounting unit 100 will be briefly described with reference to these figures.

In the ESS pack having a large size and a large capacity, as described above (see FIG. 4), the first mounting unit group G1 may be arranged at the rear left edge of the ESS pack case 10 in the up/down direction, and the second mounting unit group G2 may be arranged at the rear right edge of the ESS pack case 10 in the up/down direction. In this case, the handle unit 200 may include a first handle unit 200 attachable to and detachable from the first mounting unit 100 and a second handle unit 200 attachable to and detachable from the second mounting unit 100.

Since a method of attaching and detaching the first handle unit 200 is identical to a method of attaching and detaching the second handle unit 200, a method of attaching and detaching only one of the first and second handle units will be described.

First, the first handle unit 200 is vertically stood such that the latch catching portions 221 of the locking bar 220 are respectively located at equal levels to the mounting units 100 of the first mounting unit group G1. Here, the opening 222 of the latch catching portion 221 faces towards the latch portion 120 of the mounting unit 100.

Next, the first handle unit 200 is closely pressed to the rear surface of the ESS pack case 10 such that the latch portion 120 of the mounting unit 100 comes into the catching space 223 through the opening 222 of the latch catching portion 221. As shown the figures set forth above, it is preferable that a step be formed on the rear surface of the ESS pack case 10 as much as the thickness of the locking bar 220, thereby closely pressing the first handle unit 200 to a step surface 14a of the rear surface of the ESS pack case 10.

Next, the first handle unit 200 is vertically lifted upwards, whereby the latch portion 120 of the mounting unit 100 may be completely hung on the latch catching portion 221 of the locking bar 220. A method of detaching the first handle unit 200 may be performed in the reverse order of the mounting method set forth above.

As shown in FIG. 10, two operators may respectively mount the first handle unit 200 and the second handle unit 200 to the first mounting unit group G1 and the second mounting unit group G2 of the ESS pack, followed by lifting up the ESS pack to a desired position and mounting the ESS pack to an ESS pack hanger (not shown) prepared on a wall in advance. For reference, the rear cover plate 14 of the ESS pack may include a bracket 16 mountable to the hanger set forth above and a heat dissipation plate 18 for heat dissipation of the ESS pack.

According to the jig set 20 for mounting an ESS pack, according to an embodiment of the present disclosure, the load of the ESS pack may be more stably supported than in the case of lifting up the ESS pack by grasping a handle of the ESS pack, according to the related art. In particular, although it is difficult to mount the ESS pack having an extremely large size to a wall by lifting up the ESS pack if operators work out of harmony despite the presence of a handle of the ESS pack, when the jig set 20 according to this embodiment is used, each of two operators may grasp the handle unit 200 with both hands, whereby the ESS pack may be lifted up with a proper force and mounted to a wall.

In addition, the mounting unit 100 is a component of the jig set 20 used to transport the ESS pack, and may also be used for fastening assembly parts of the ESS pack case 10. In other words, when the jig set 20 according to the present disclosure is used, a handle used only for one-off transportation of the ESS pack when mounting the ESS pack may be omitted from the ESS pack, and the mounting unit 100 may be used instead as a necessary part for transporting the ESS pack and assembling a case main body. In this case, the ESS pack, to which this embodiment is applied, may have further reduced manufacturing costs than the ESS pack including an existing handle.

Figure 11:
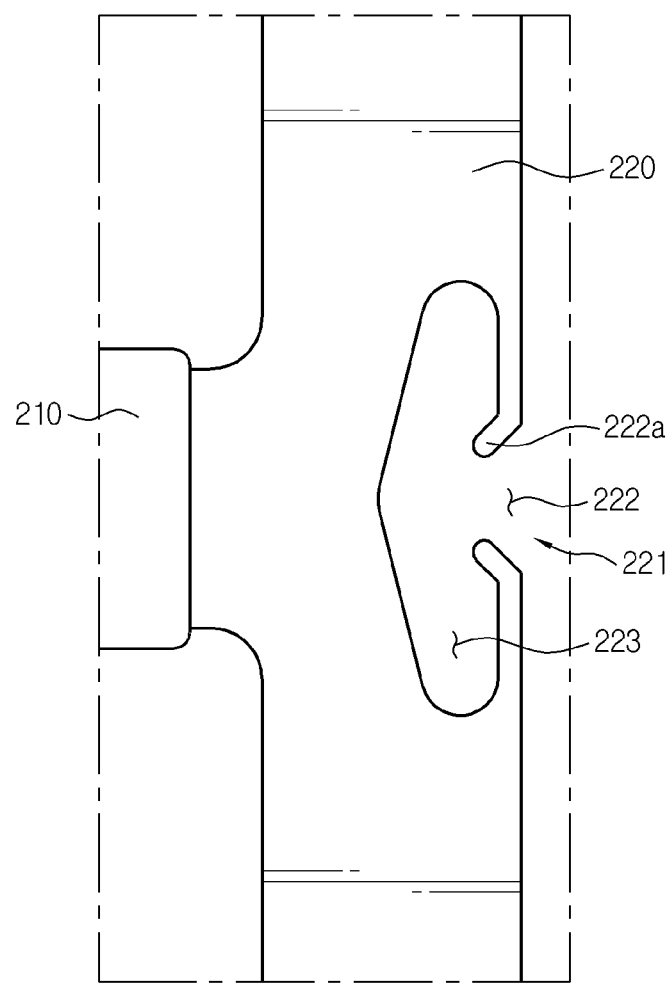
FIG. 11 is a diagram illustrating a modified example corresponding to the embodiment of FIG. 6.

FIG. 11 is a diagram illustrating a modified example of an embodiment of the present disclosure and corresponds to FIG. 6.

Like members will be denoted by like reference numerals, and repeated descriptions thereof will be omitted.

As a modified example of the embodiment set forth above, the latch catching portion 221 may be configured such that the opening 222 has a shape tapered toward the catching space 223. For example, as shown in FIG. 11, the opening 222 may have a gradually decreasing diameter toward the catching space 223. Here, the opening 222 may have a minimum diameter, which almost coincides with the diameter of the latch portion 120 of the mounting unit 100, and a maximum diameter, which is less than the diameter of the head portion 130.

In the case of the embodiment set forth above, when the handle unit 200 is mounted to the mounting unit 100, if the locking bar 220 is closely pressed toward the mounting unit 100 while the opening 222 of the latch catching portion 221 and the latch portion 120 of the mounting unit 100 are not located exactly on the same line, the latch portion 120 may not come into the catching space 223, and may damage surrounding regions of the opening 222.

However, in the case of this modified example, since the latch portion 120 may be guided into the catching space 223 along a slope 222a of the opening 222 in the same situation as the above situation in which there is a slight position error between the opening 222 and the latch portion 120, damage to surrounding regions of the opening 222 may be prevented, and it may be easier to mount the handle unit 200 to the mounting unit 100. In addition, since an end of the slope 222a of the opening 222 is located inside the catching space 223, the latch portion 120 may not more easily deviate from the latch catching portion 221 than in the embodiment set forth above, thereby further improving safety.

Heretofore, although preferred embodiments of the present disclosure have been described, it should be understood that the present disclosure is not limited to the specific preferred embodiments described above, and that various modified examples and changes can be made by those skilled in the art without departing from the scope of the disclosure.

As used herein, terms indicating directions such as "up", "down", "left", "right", and the like are only for convenience of description, and it will be obvious to those skilled in the art that these terms may be expressed differently depending upon viewing positions of an observer, positions of an object, or the like.

What is claimed is:

1. A jig set for mounting an energy storage system (ESS) pack, which is used to mount an ESS pack to a wall or a structure corresponding to the wall, the jig set comprising:
a plurality of fasteners, each fastener having a partially protruding portion capable of being coupled to one surface of an ESS pack case;
a handle comprising a handlebar to be grasped by an operator, and a locking bar, which is integrally connected to the handlebar and is attachable to and detachable from the protruding portion of each of the fasteners, the locking bar having a first edge and a second edge spaced from the first edge in a first direction; and
a plurality of catches extending from the first edge of the locking bar and spaced from each other in a second direction, each catch configured to receive one of the plurality of fasteners,
wherein the handlebar comprises a plurality of first sections extending from the locking bar in a third direction and spaced from each other along the locking bar in the second direction and a second section extending in the second direction and connected to the plurality of first sections.

2. The jig set according to claim 1, wherein each of the plurality of catches is T-shaped.

3. The jig set according to claim 1, wherein the handlebar and the locking bar form an angle of 90 degrees or more.

4. The jig set according to claim 1, wherein the fastener is a bolt configured to integrally combine a front cover plate and a rear cover plate, which form the ESS pack case.

5. A jig set for mounting an energy storage system (ESS) pack, which is used to mount an ESS pack to a wall or a structure corresponding to the wall, the jig set comprising:
a plurality of fasteners, each fastener having a partially protruding portion capable of being coupled to one surface of an ESS pack case; and
a handle comprising a handlebar to be grasped by an operator, and a locking bar, which is integrally connected to the handlebar and is attachable to and detachable from the protruding portion of each of the fasteners, the locking bar having a first edge and a second edge spaced from the first edge in a first direction; and a plurality of catches extending from the first edge of the locking bar and spaced from each other in a second direction, each catch configured to receive one of the plurality of fasteners, wherein each of the plurality of fasteners comprises a fastening portion, a latch portion, and a head portion, which are defined along a length direction of the fastener, the fastening portion configured to be fixed and coupled to an inside of the ESS pack case, the latch portion and the head portion configured to be exposed outside the ESS pack case, and the latch portion having a diameter less than a diameter of the head portion, and the locking bar has a shape of a plate having a thickness less than a length of the latch portion, wherein each of the plurality of catches comprising an opening extending in the first direction, each of the openings being larger than a diameter of the latch portion and smaller than a diameter of the head portion, and a catching space extending in the second direction.

6. The jig set according to claim 5, wherein the handle is a plurality of handles to be spaced apart from each other by a predetermined interval in the first direction.

7. The jig set according to claim 6, wherein the plurality of fasteners comprise a first fastener group arranged in the second direction and a second fastener group arranged in the second direction, and wherein the plurality of handles comprises a first handle configured to be attachable to and detachable from the first fastener group and a second handle configured to be attachable to and detachable from the second fastener group.

8. The jig set according to claim 5, wherein a width of the catching space in the first direction is less than a length of the catching space in the second direction, and wherein the width of the catching space in the first direction is less than the diameter of the head portion.

9. The jig set according to claim 8, wherein the opening is located in a central region of the catching space, and the latch catching portion has a C-shape.

10. The jig set according to claim 8, wherein the opening has a shape tapered toward the catching space in the first direction.

* * * * *